United States Patent [19]

Eppler et al.

[11] Patent Number: 5,016,281

[45] **Date of Patent: * May 14, 1991**

[54] IMAGE ANALYSIS COUNTING SYSTEM

[75] Inventors: Susan G. Eppler, Garland; Robert M. Moorehead, Richardson, both of Tex.

[73] Assignee: Comar, Inc., Tex.

[*] Notice: The portion of the term of this patent subsequent to Oct. 9, 2007 has been disclaimed.

[21] Appl. No.: 468,695

[22] Filed: Jan. 23, 1990

Related U.S. Application Data

[63] Continuation-in-part of Ser. No. 348,710, Jun. 7, 1989, Pat. No. 4,962,538, which is a continuation-in-part of Ser. No. 309,243, Feb. 13, 1989.

[51] Int. Cl.[5] .............................................. G06K 9/00

[52] U.S. Cl. .......................................... 382/1; 382/8; 382/65; 250/222.2

[58] Field of Search ..................... 382/1, 8, 65, 28, 67; 250/222.2, 223 R, 560; 356/381, 382, 383, 385, 386, 387; 377/53, 6, 8

[56] References Cited

U.S. PATENT DOCUMENTS 4,450,352 5/1984 Olsson ............................ 250/223 R 4,962,538 10/1990 Eppler et al. .......................... 381/1

*Primary Examiner*—Michael Razavi

*Attorney, Agent, or Firm*—Ross, Howison, Clapp & Korn

[57] ABSTRACT

A system for counting overlapped newspapers delivered to a stacker which employs an optical sensor which is passive in nature. Accurate count is obtained by image analysis of the image presented by the edge of the newspaper flow as the image is focused on a linear CCD array. Definitive values are determined which are quantitative of the top profile, height, of the newspapers. The processing technique employed determines the rate of change of the height of the image and utilizes the rate of change data to output a newspaper count increment when the rate of change, derivative, of top profile height changes from a positive value to a negative value and the measured profile height exceeds a calibrated value thickness, and outputs two newspaper count increments when the measured profile height exceeds a second calibrated value thickness.

2 Claims, 17 Drawing Sheets

IMAGE ANALYSIS COUNTING SYSTEM

RELATED APPLICATION

This application is a continuation-in-part of U.S. Application Ser. No. 07/348,710 filed on June 7, 1989, and now U.S. Pat. No. 4,962,538 and entitled "Image Analysis Counting System" which is a continuation-in-part of U.S. Application Ser. No. 07/309,243 filed on Feb. 13, 1989 and entitled "Image Analysis Counting System."

TECHNICAL FIELD

This invention relates in general to counting methods and counting systems, and more particularly to an object counting system which utilizes image analysis techniques much in the manner that the human vision system would analyze and count objects.

BACKGROUND OF THE INVENTION

Various systems of counting have been developed in the prior art for the purpose of, for example, counting the number of newspapers conveyed from a newspaper press. These systems fall generally into mechanical, ultrasonic, laser, and infrared categories.

For years, mechanical counters have been used to count newspapers in overlapped stream conveyors and to control the cycling of newspaper stackers. In a few isolated cases, the counts obtained have been fed to totalizing devices of several varieties. The principal advantage of mechanical counters is their relatively low cost. Disadvantages of such counters include inaccurate counting (especially of small size products and of very large awkward products, such as an inserted package), high maintenance and rapid wear-out. Mechanical counters are poorly suited to use with gripper type conveyors now prevalent in newer installations. Also, mechanical counters will not sense doubles.

Ultrasonic counters pick up perturbations in pressure as papers pass under an electro-mechanical transducer. These devices contain many mechanical components that are subject to fouling by paper dust that pervades the operating environment. Ultrasonic counters are somewhat sensitive to variations in paper-to-transducer distance. Unfortunately, such variations are common in newspaper streams. Like their mechanical counterparts, ultrasonic devices will not sense doubles.

Despite the favorable reputation of many laser devices, their use for newspaper counting gets mixed reviews from users—probably because of their limited shelf life and operating life. The user is not comfortable with the knowledge that a new spare may not work when he needs it. Although the He-Ne lasers commonly used in newspaper counting applications are relatively cheap compared to more powerful laser devices, they do, nonetheless, represent a continuing replacement cost of consequence to the publisher. Laser counters rely on changes in reflected light beams to record counts.

Infrared counters, like laser devices, utilize reflected energy for counting. They are expensive and do not sense thin products as well as thick ones.

In the newspaper publishing business, the need for an accurate count of newspapers being output in a particular press run is essential to the attainment of necessary good business practices. With the ever-increasing and skyrocketing cost of newsprint, it is no longer an acceptable business practice in the publishing field to print more newspapers during a particular press run than the calculated demand. Conversely, it is obviously impractical and poor business practice, and, in fact an unacceptable business practice for a pressroom to print considerably more papers than can be sold. In short, it has become imperative that an extremely accurate print count be obtained on the actual output count of a press run, neither too many nor too few.

All of the prior art sensing means cited above rely upon some sort of perturbation. In the case of mechanical counters, the change is to the unperturbed state of the contact star wheel or other mechanism. In the case of all of the other devices, sensing is accomplished by detecting a change in the emitted energy—such change being the consequence of passage of a newspaper.

SUMMARY OF THE INVENTION

The present invention employs a sensor which is totally passive. The sensor "sits" and "looks" at the passing scene and recognizes and analyzes what it sees. The sensor to be described is an all-electronic "smart" system that uses techniques of image processing. It functions very much like the human eye.

The present invention includes a unique optical system which essentially duplicates that which would be observed by the human vision system to make a meaningful interpretation of what it is observing as it "looks" at the extreme high output speed of articles to be counted. The invention provides an optical sensing system which, in essence, duplicates the human eye in a manner that may be provided by the human eye were the output run being counted by slowing down to an obviously impractical speed, rather than the extremely high speed runs commonly employed in the publishing industry.

The present invention is further featured in the provision of an optical sensing system which uniquely "looks" at the side edge of a press output run of overlapped printed materials, and may thus interpret completely overlapped newspapers which otherwise might be counted as one newspaper rather than a plurality of newspapers.

The present invention is further featured in a unique optical counting system which is passive in nature and, like the human vision system, is capable of analyzing the passing image to obtain a count and capable of recalibrating to thus dynamically adjust to image changes and capable of obtaining an accurate count which is unaffected by undesirable perturbations of the image which might be imposed upon the objects to be counted.

BRIEF DESCRIPTION OF DRAWINGS

For a more complete understanding of the present invention and for further advantages thereof, reference will now be made to the following Description of the Preferred Embodiments taken in connection with the accompanying Drawings in which.

DESCRIPTION OF THE PREFERRED EMBODIMENTS

Figure 1:
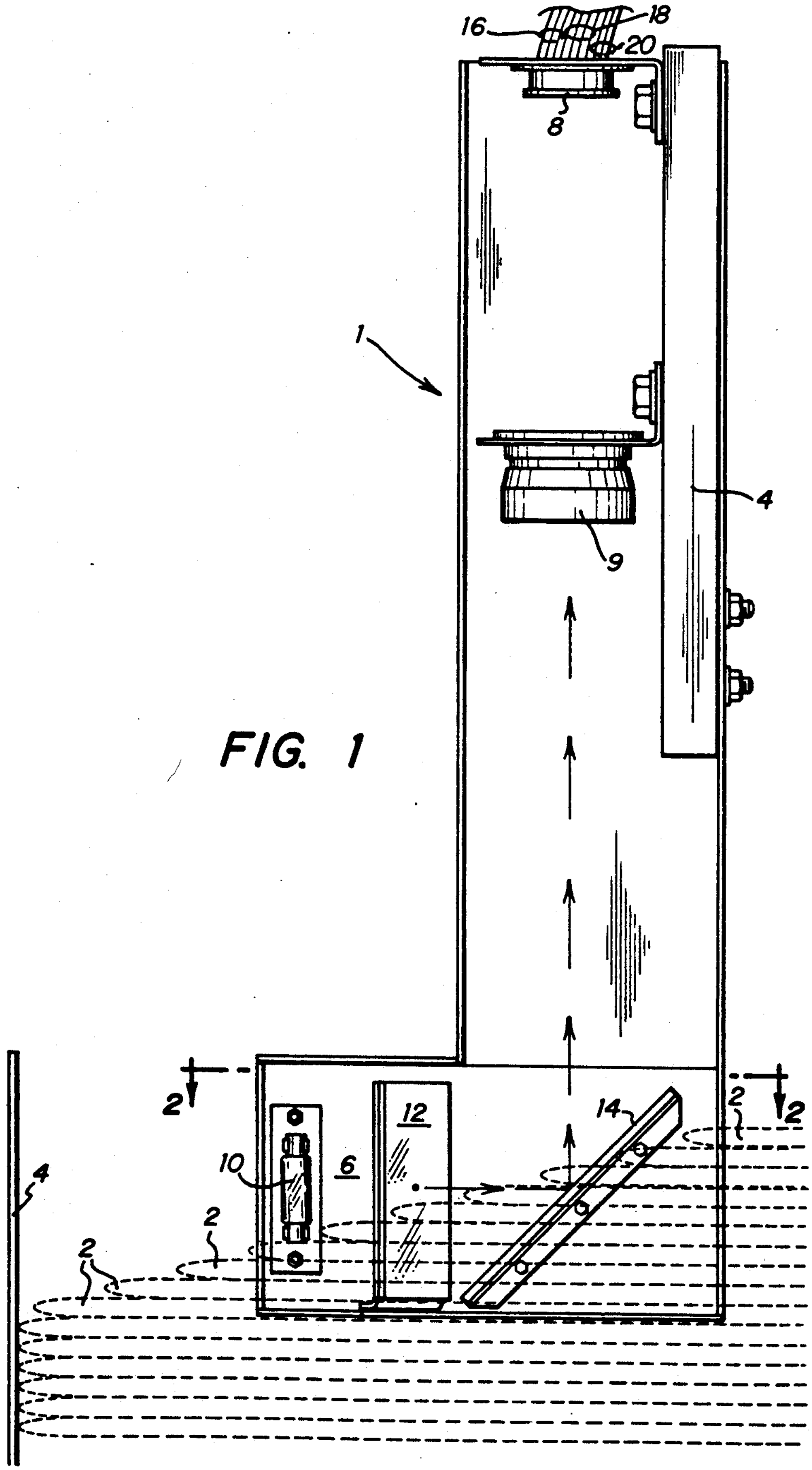
FIG. 1 is a side view of the optical subsystem as employed in the present invention.

The invention to be described provides a method of obtaining an accurate count by image analysis of overlapped newspapers in a newspaper stacker. The system is not subject to stacker speed and/or minimum overlap requirements which exist in mechanical counting systems and all other systems which sense the top of the papers rather than the side edge of the paper run as provided hereby. The system to be described provides a method of obtaining a count of overlapped newspapers in a stacker by a sensor system which performs image analysis on the image looking at the side edge of the newspaper stream. Utilizing the side edge image of the newspaper stream provides the sensor system with the maximum amount of information so that, for example, newspapers which are directly overlapped or set back underneath another newspaper can be counted and so that, for example, an insert slipped back inside its cover will not be counted twice.

The sensor subsystem of the present invention includes a lens system, a self-contained illumination source, and a viewing window. Due to space limitations in a newspaper stacker, the present sensor subsystem is arranged such that the illumination light path to the side edges of the newspaper stream is generally perpendicular to the path of reflected light to the lens system. The viewing window is disposed in a plane generally perpendicular to the plane containing the image sensor.

The electrical subsystem performs a method of obtaining a count of newspapers in a stacker by image analysis of light reflected from the edges of the newspapers as the reflected light impinges on a linear CCD array which is oriented in a plane generally perpendicular with respect to the plane containing the newspaper edges.

The electrical subsystem of the sensor system performs repetitive sequential steps of serially shifting analog outputs from the CCD array to a differential amplifier to remove the D.C. output offset therefrom, amplifies the resulting signal, and converts the analog output signal from the differential amplifier to a serial digital output signal as defined by a selected light level.

This serial digital output is applied to a serial in/parallel output shift register from which parallel output is stored in a RAM. The data stored in the RAM is transferred to a microprocessor.

In general the computation subsystem through software control reads the image analysis data in the RAM to create a representation in software of the newspaper edge image as it travels by the sensor system. The software determines a definitive numerical representation of the top profile of the newspaper run image as it passes the optical system and thereby obtains definitive newspaper height data and change in newspaper height data which is specified as a definitive time derivative of the newspaper height data.

The software utilizes definitive height data and time derivative data to determine calibrated image height and derivative values which are utilized to perform software newspaper count determination.

The software utilizes the instant definitive positive derivative greater than the calibrated derivative as a determination of the leading edge of a newspaper presence, such that the system is self-calibrating. History information pertinent to the previous newspaper profile is saved by microprocessor as a reference for determination of the height of the next overlapping newspaper as it passes by the optical system, and then utilizes the definitive change in the instant or present derivative on the present newspaper profile from positive to negative as an indicator to obtain the present definitive height value with the calibrated height value for determination that the object is a newspaper and initiates a single count output increment when the above criteria has been satisfied. The microprocessor initiates a double count increment when the present definitive height value is compared with a definitive value representing that two newspapers are completely overlapped as they pass by the optical system, and thus utilizes a digitally stored newspaper profile height and rate of change of newspaper profile height to accurately provide an output newspaper count.

Figure 2:
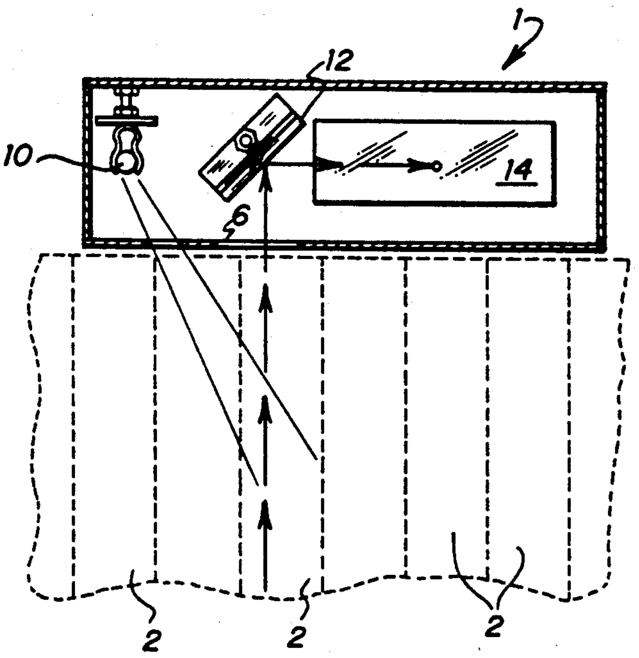
FIG. 2 is a sectional view taken generally along sectional lines 2—2 of FIG. 1 illustrating the optical subsystem of the present invention.

The optical subsystem of the present invention is illustrated in FIGS. 1 and 2, and is generally identified by the numeral 1. Referring simultaneously to FIGS. 1 and 2, a flow of overlapped newspapers 2 are delivered to a stacker generally identified by the numeral 4. The flow of newspapers 2 is generally in a plane perpendicular to the plane of FIG. 1 and parallel to the plane of FIG. 2. Optical subsystem 1 includes a window 6 through which the edges of newspapers 2 are viewed for reflection to a detector array 8, such as, for example, a linear CCD array through a lens system 9. CCD array 8 may comprise, for example, a CCD array model TC103 manufactured and sold by Texas Instruments, Inc., Dallas, Texas.

In accordance with the present invention, the edges of newspapers 2 are illuminated by a light source 10 through window 6. The reflections off the edges of newspapers 2 impinge upon a mirror 12 which is disposed adjacent light source 10. Mirror 12 is disposed at approximately a 45° angle with respect to the edges of newspapers 2 as newspapers 2 pass before window 6. The reflections of the edges of newspapers 2 are transmitted from mirror 12 to a mirror 14 which is disposed at approximately a 45° angle with respect to mirror 12. As a result, the image of the edges of newspapers 2 are reflected 90° with respect to window 6 for focusing through lens system 9 for impingement upon detector array 8. It is therefore not necessary for detector array 8 to lie in a plane parallel to the edges of newspapers 2 which would require additional space considerations within stacker 4. Since CCD array 8 and lens system 9 are located in a plane perpendicular to the edges of newspapers 2, space considerations are not a factor utilizing the present optical subsystem 1.

Figure 3:
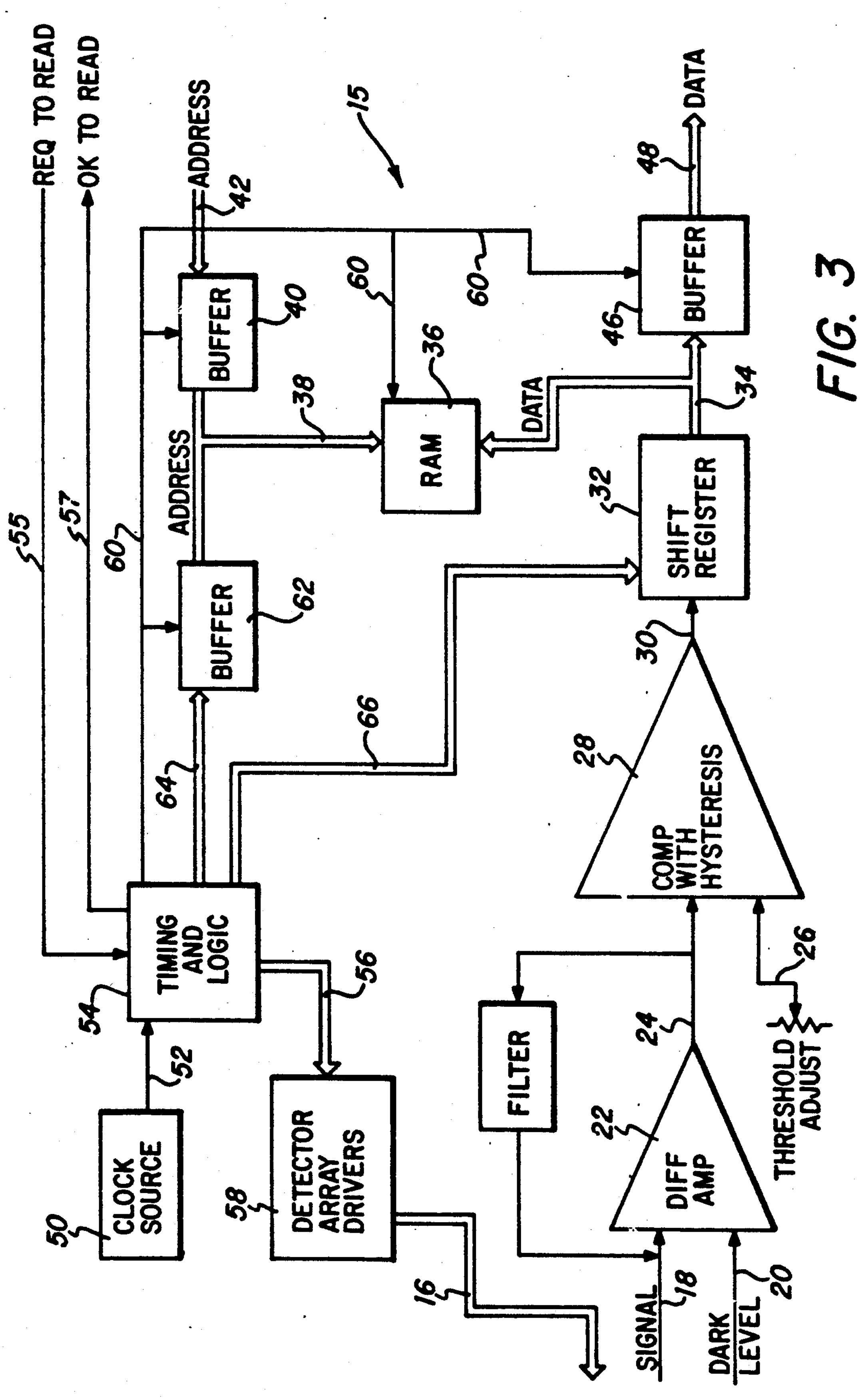
FIG. 3 is a functional block diagram of the signal processing section of the electronics subsystem as employed in the present invention.

With reference to FIG. 3 analog outputs from the linear CCD array 8 (FIG. 1) are input to an image signal processing circuitry 15. Multiple driver lines 16 apply a signal to the detector array 8 to serially shift the analog outputs from the array photodetectors on line 18 and a reference dark level output 20 from CCD array 8 to a differential amplifier 22 to remove the D.C. offset therefrom and amplify the signal and filter high frequency noise therefrom. Output from the differential amplifier 22 is applied on line 24 along with a threshold adjustment signal on line 26 as respective inputs to a comparator 28 whereby the output signal from the differential amplifier 22 is converted to a serial digital output signal as defined by a selected light level on comparator output line 30.

Figure 4:
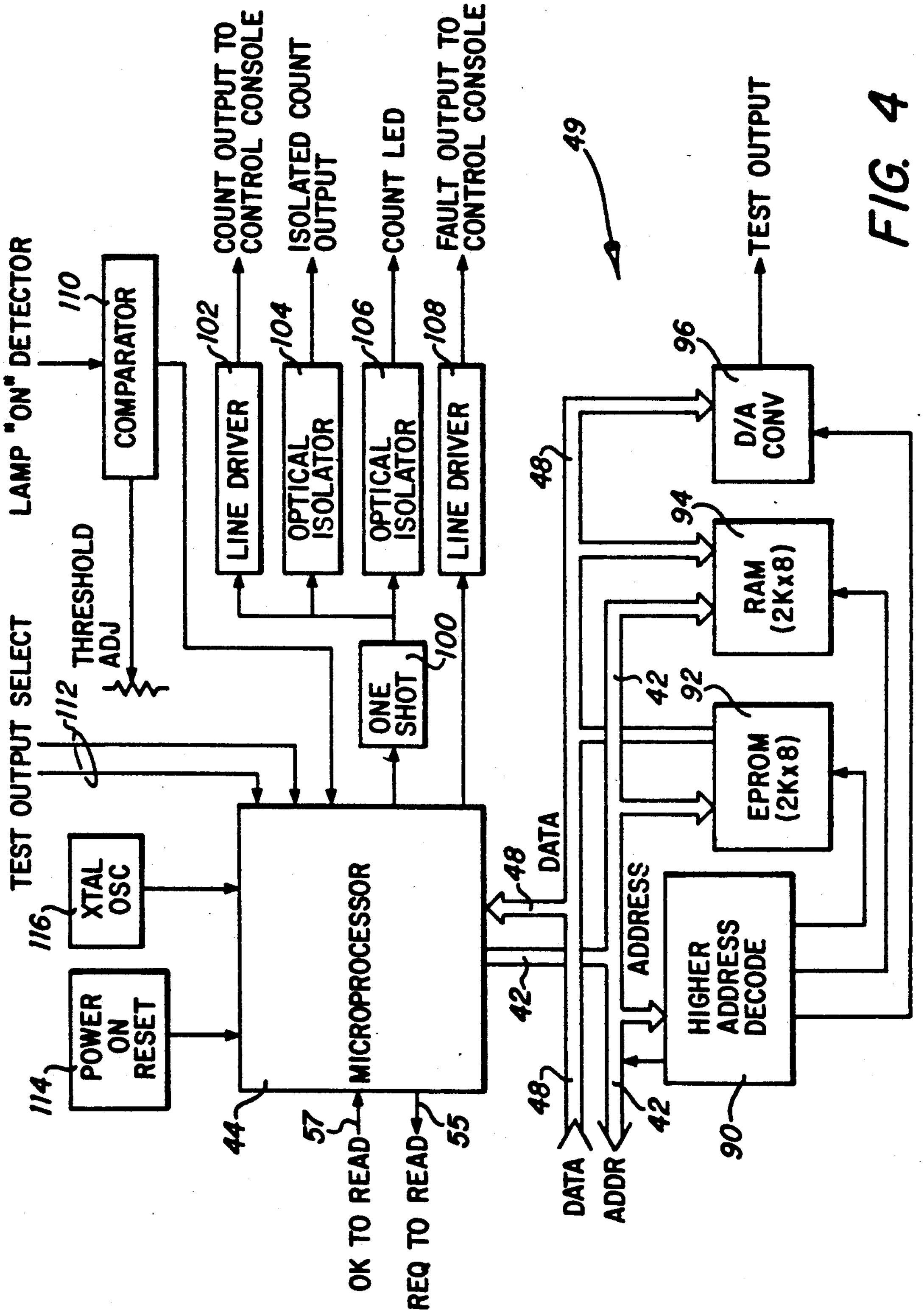
FIG. 4 is functional block diagram of the microprocessor subsystem of the present invention.

The serial digital output signal on line 30 is input to a serial in/parallel out shift register 32. Parallel output on line 34 from shift register 32 is input to a RAM 36 under control of an addressing line 38 from buffer 62 which receives addressing information on line 64 from timing and logic circuitry 54. The parallel data output from RAM 36 is applied through a buffer 46 on line 48 to microprocessor subsystem 49 (FIG. 4).

The image signal processing circuitry of FIG. 3 further comprises a clock source 50 which provides an output on a line 52 to timing and logic circuitry 50. Timing and logic circuitry 54 provides an output on line 56 to CCD array drivers 58, the output via lines 16 of which is applied to read the analog information in serial fashion from the linear detector array 8. Timing and logic circuitry 54 additionally applies timing control on line 60 as a control input to buffers 62, 40, and 46 and RAM 36. Timing and logic circuitry 54 provides further control on lines 64 to buffer 62 and on line 66 to the serial-in/parallel-out shift register 32. When a request to read signal is generated by microprocessor 44 (FIG. 4) applied to timing and logic circuitry 54 via signal line 55, timing and logic circuitry 54 holds off generating the OK to read signal generated on signal line 57, until the data has completed shifting out of CCD array 8 and into the RAM 36. Then timing and logic circuitry 54 drives line 60 in order to enable buffers 40 and 46 and disable buffer 62. Timing and logic circuitry 54 also generates a signal via signal line 66 in order to terminate the shifting of data from shift register 32 into RAM 36. The address information via line 42 from microprocessor subsystem 49 (FIG. 4) is applied via buffer 40 and signal line 38 to RAM 36 so that data previously stored within RAM 36 can be applied via line 34 to buffer 46 for output via line 48 to microprocessor 44 (FIG. 4).

Thus paralleled output from shift register 32, representing successive parallel-slice images of the edges of the newspapers on the conveyor as developed in the CCD array 8 upon which the image is focused, are applied to microprocessor subsystem 49 (FIG. 4) for development of a count of newspapers as they pass by the optical system by using the vertical slice like images of the paper flow edges.

In accordance with the present invention, the microprocessor subsystem 49 (FIG. 4) receives digital data from the image signal processing circuitry of FIG. 3 via signal lines 48 and from this data the software determines where the top of the image presented to the CCD array 8 of FIG. 1 lies. The term top will be defined as the newspaper height. The software determines from the digital data concerning the height of the newspaper run profile from top to bottom where the top of the profile appears in the CCD array 8 of FIG. 1. This determination is performed for successive image "slices" as they impinge on the CCD array 8 as the newspapers are conveyed past the detector system of FIG. 1.

Referring now to FIG. 4, microprocessor subsystem 49 is illustrated and includes microprocessor 44. Microprocessor 44 may comprise, for example, a model TMS7000 manufactured and sold by Texas Instruments Inc. and which is described in a publication entitled "8-Bit Microcomputer Family", Publication No. SND001B, published by Texas Instruments Incorporated, 1986. Associated with microprocessor 44 is an 8-bit data bus 48 and a 20-bit address bus 42. Higher order addressing decoding is performed by higher address decode circuitry 90 which selects on address line 42 whether microprocessor 44 will be communicating with an erasable programmable read-only memory (EPROM) 92, or a random access memory (RAM) 94, or whether microprocessor 44 will be loading data into a digital-to-analog converter 96. EPROM 92 provides storage for the software utilized with the present invention. RAM 94 is an operational RAM which is used in conjunction with the built-in RAM of microprocessor 44. Digital-to-analog converter 96 provides an analog test output for microprocessor subsystem 49 and operates under the control of EPROM 92 which controls the data to be shifted into digital-to-analog converter 96 depending on the particular test to be performed. One particular test, which will subsequently be described with respect to FIG. 6, is the output of the top profile of a newspaper. A signal which is proportional to the top edge of the paper is generated for test purposes.

Microprocessor 44 generates an output signal to a one shot device 100. This output signal represents the detection of a newspaper. The output of one shot device 100 is applied to a line driver 102, and optical isolators 104 and 106. The output of line driver 102 provides an output to a control console which may be located at a remote site. Optical isolator 104 provides an output to a control console requiring isolation from microprocessor subsystem 49. Optical isolator 106 provides an output to a light emitting diode display which is actuated each time a newspaper is detected. In this manner, the operator of the present system can easily determine that the system is operational and detecting newspapers. Microprocessor 44 also generates a signal via a line driver 108 indicating a fault condition which is output to the control console.

An input to microprocessor 44 is also provided via a comparator 110 from a lamp "on" detector which may comprise, for example, a photodetector which is mounted to receive light from light source 10 (FIG. 1) and is actuated in the presence of light. The output of the lamp "on" detector is applied to comparator 110 which includes a threshold adjustment. In the absence of a signal from the lamp "on" detector, a signal is generated to microprocessor 44 indicating insufficient light for system operation for use by the software to generate a fault condition. Microprocessor 44 also receives inputs via signal lines 112 comprising a test output select input in order to select a particular test output from digital-to-analog converter 96. Microprocessor 44 also receives inputs from a power on reset 114 and a crystal oscillator 116 for controlling power and timing functions, respectively within microprocessor 44.

The software to be subsequently described with respect to FIG. 6, is programmed to obtain the difference between successive determinations of the newspaper run top image (newspaper height). These determinations are made at a clock defined rate and thus correspond to the rate of change (derivative) of the top profile of the paper run as carried by the conveyor past the CCD array. When this derivation of newspaper height changes from a positive (increasing) value to a negative (decreasing) value, the software calculates the maximum height of the newspaper run profile based on a previously determined value of the top profile and at this instant initiates a newspaper count. This procedure is graphically illustrated in FIG. 5 wherein the linear CCD array 8 is graphically illustrated in terms of its orientation with an overlapped newspaper 2 delivered to stacker 4 as it might be oriented with respect to a reference plane 70 determined by the bottom of the linear detector array 8. However, it being understood that array 8 is actually disposed 90° from the position shown in FIG. 5. Linear CCD array 8 might comprise, for example, 2048 CCD cells arranged parallel of the stacked newspaper surface 68 and thus parallel to a plane containing the overlapped newspapers being stacked by stacker 4.

A first newspaper 72 in the overlapped run, as it is conveyed past the linear CCD array 8 causes a large positive derivative referenced from the bottom of the array since no detectors are illuminated when there is no newspaper present, to the detectors which are illuminated when the first newspaper "appears". Then an output count pulse is initiated.

Figure 5:
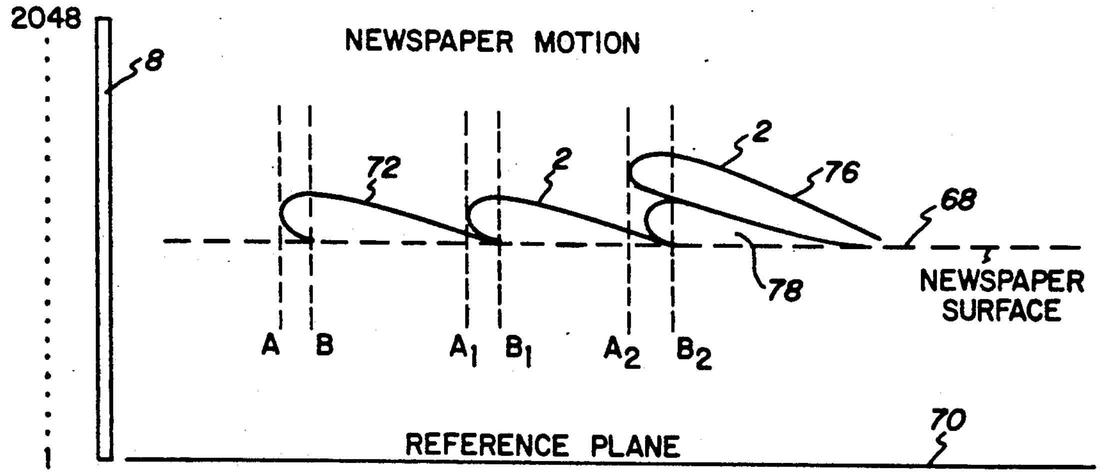
FIG. 5 is a diagrammatic representation of the software generated image of a newspaper as it passes the sensor system which aids in the explanation of the operating principles employed by the software in the invention.

Further, referring to FIG. 5, the derivative of the newspaper run top profile is obtained from the difference between comparison of successive newspaper height determinations and, as graphically illustrated in FIG. 5, is positive from point A to point B. At point B, the rate of change of the top profile (newspaper height) is zero and the derivative of the top profile (height) changes from positive to negative. This negative derivative of the newspaper height continues until the point $A_1$ in FIG. 5 at which time the leading edge of the second newspaper in the run passes the linear detector array 8 and the derivative of the newspaper height goes from negative to positive. Thereafter when the rate change (derivative) of newspaper height goes from positive to negative as at point $B_1$, a second count is output and the height of the newspaper run is determined by the difference between the top of the profile height measurement at point $B_1$ and at the top of the previous newspaper immediately prior the derivative changing from negative to positive at point $A_1$. A calibrated height and derivative value is calculated after the first 16 newspapers pass the sensor 8 and these values are updated on every newspaper thereafter. Initially minimum values are assumed so that no newspapers are missed. When the measured profile height is greater than $\frac{3}{8}$ of the reference or calibrated height an output count signal is initiated. If the measured paper run profile height is greater than twice the reference or calibrated height value, two output count signals are initiated. This latter situation is depicted graphically in FIG. 5 at point $A_2$ as two completely overlapped newspapers 76 and 78 pass by the linear detector array 8, the calibrated top profile height being the difference between top profile height determinations at points $A_2$ and $B_2$.

Since the system described operates on determinations of the height and the rate of change of the height and the rate of change of height of the top profile of the newspaper run as it is imaged on linear detector array 8 and subsequently processed, environmental conditions, cocked newspapers, rippled edges, etc. the signal which the microprocessor 44 receives may have noise or fluctuation. These perturbations are interpreted by the software as noise and are eliminated. The shielding arrangement, discussed with reference to FIG. 2 and the optical arrangement discussed with reference to FIG. 1 operate in concert to assure immunity against ambient light perturbations. The depth of field of the lens system 6 renders the system immune to light perturbations from sources beyond that depth of field while the shadow provided by the light shielding arrangement, through which reflected light is projected through the lens system 6 of FIG. 1, further provide immunity from ambient light perturbations.

Referring now to FIG. 6, comprising FIGS. *6a–6o* of computer flow diagrams, the software for use with the present system will now be described. Briefly, FIGS. *6a*, *6b* and *6c* represent the main program with branches to the various subroutines of the present system. FIG. *6d* is a subroutine that initializes all registers within microprocessor 44 and random access memory 94. FIG. *6e* represents the subroutine for reading random access memory 36 (FIG. 3) in order to extract the top profile of a newspaper and assign a relative value for the top edge of the newspaper. FIG. *6f* is a subroutine for outputting the analog test signal from digital-to-analog converter 96 which is selectable via the inputs from signal lines 112 (FIG. 4) to microprocessor 44. FIG. *6g* represents the program for calculating the positive derivative value when there is an increase and a negative derivative value when there is a decrease in the profile of a newspaper. FIG. *6h* represents the software of the history subroutine for maintaining a history file of the previous four values for the top of a newspaper and the derivative values. FIGS. *6i* and *6j* represent the software for the new detect subroutine and contain the criteria for detecting one or two newspapers and for eliminating erroneous noise perturbations. FIG. *6k* represents the software for the calibration subroutine and determines the calibration value for height and derivatives. FIG. 61 is a flow diagram representing the delay subroutine for spacing the output pulses from microprocessor 44 (FIG. 4). FIG. *6m* illustrates a subroutine for outputting the pulse to trigger one shot device 100 (FIG. 4). FIG. *6n* illustrates the software for a subroutine for detecting a lamp failure by light source 10 (FIG. 1) and when a newspaper has gone above the top of detector array 8 in order to output a fault indication output from line driver 108 (FIG. 4). FIG. *6o* illustrates a subroutine for generating a timing interrupt used to space the output pulses and to determine when it is time to recalibrate the system because no newspaper has gone past detector array 8 for a predetermined time period.

Referring now to FIG. *6a*, the stack pointer is loaded at block 120 in order to partition a predetermined amount of random access memory in microprocessor 44. At block 122, the initialize subroutine loads all the initial values to zero in the initial registers of microprocessor 44 and random access memory 94 (FIG. 4). A decision is then made at block 124 to determine whether it is time to recalibrate the system. Detector array 8 automatically recalibrates if there has not been any newspapers detected within approximately, for example, five minutes. A register within microprocessor 44 is checked to determine its state. If the register contains a zero, the time to recalibrate has not passed, and if the register contains a one, then recalibration is performed.

If no recalibration is necessary, the top fetch subroutine is called at block 126. The top fetch subroutine fetches the top of the newspaper array, and will be discussed with respect to FIG. *6e*. A decision is then made at block 128 to determine if the top of the newspaper is above detector array 8. If the decision is yes, a counter is incremented at block 130 and if the counter is equal to FF (HEX) at decision block 132, a problem bit is set at block 134 which outputs a fault signal, and the fault subroutine is called at block 135. If the decision at block 132 is no, the program calls the fault subroutine at block 135.

Figure 6A:
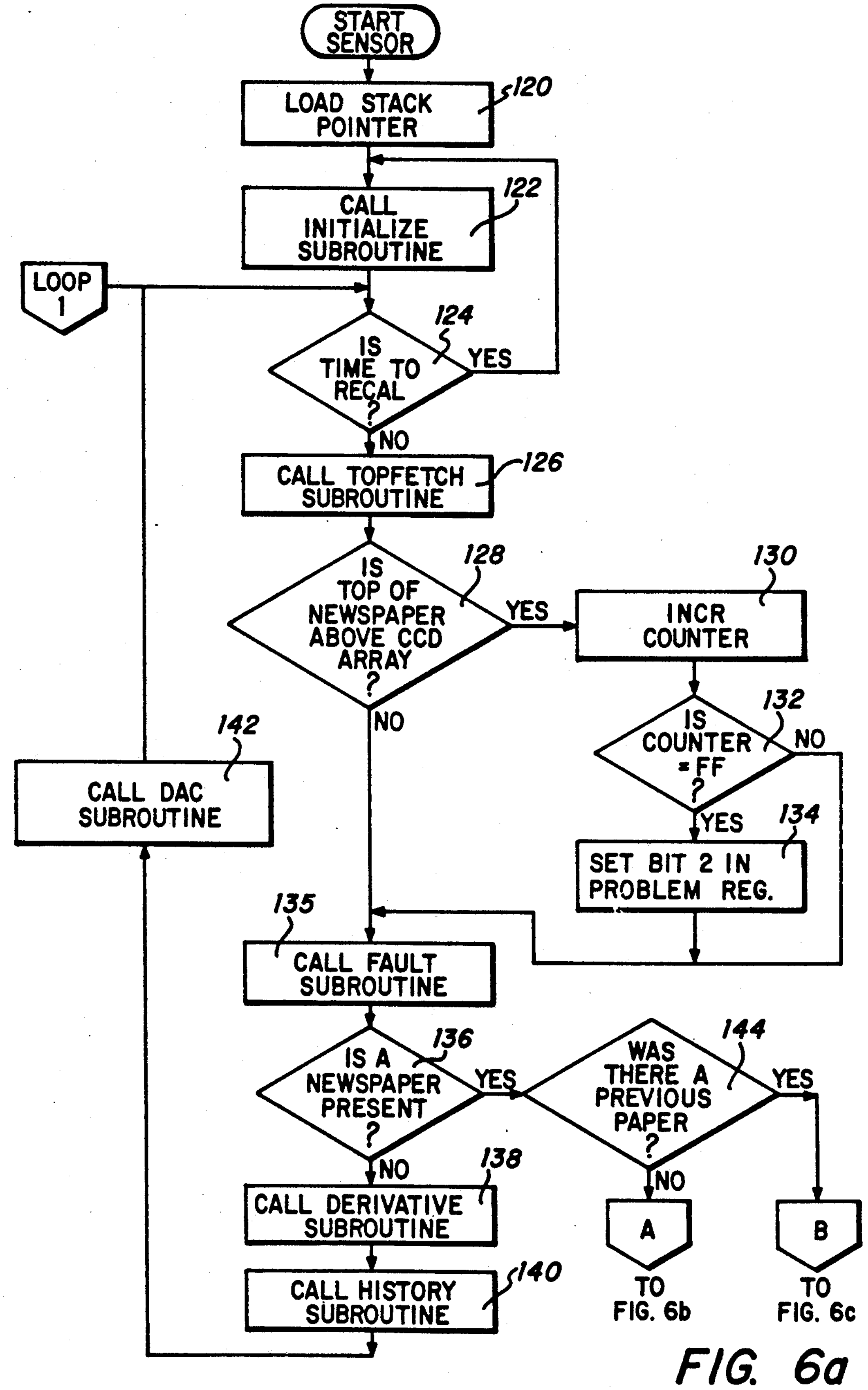
FIGS. 6a–6o are computer flow diagrams illustrating the operation of the present system.

The fault subroutine is called at block 135 which will be described with respect to FIG. 6*n* which checks all the problem bits to determine if any one bit is set. A decision is then made at block 136 to determine if a newspaper is present at detector array 8. A newspaper is present at detector array 8 if any one of the 2048 detectors is illuminated. If the answer at block 136 is no, the derivative subroutine (FIG. 6*g*) is called at block 138; the history subroutine (FIG. 6*h*) is called at block 140; and the digital-to-analog converter (DAC) subroutine (FIG. 6*f*) is called at block 142 and the program loops back to decision block 124.

If the decision at block 136 is that a newspaper is present, a decision is made at block 144 to determine if there was a previous newspaper present. If no previous paper was present, the program continues to FIG. 6*b*, and if a previous paper was present, the program continues to FIG. 6*c*.

Figure 6B:
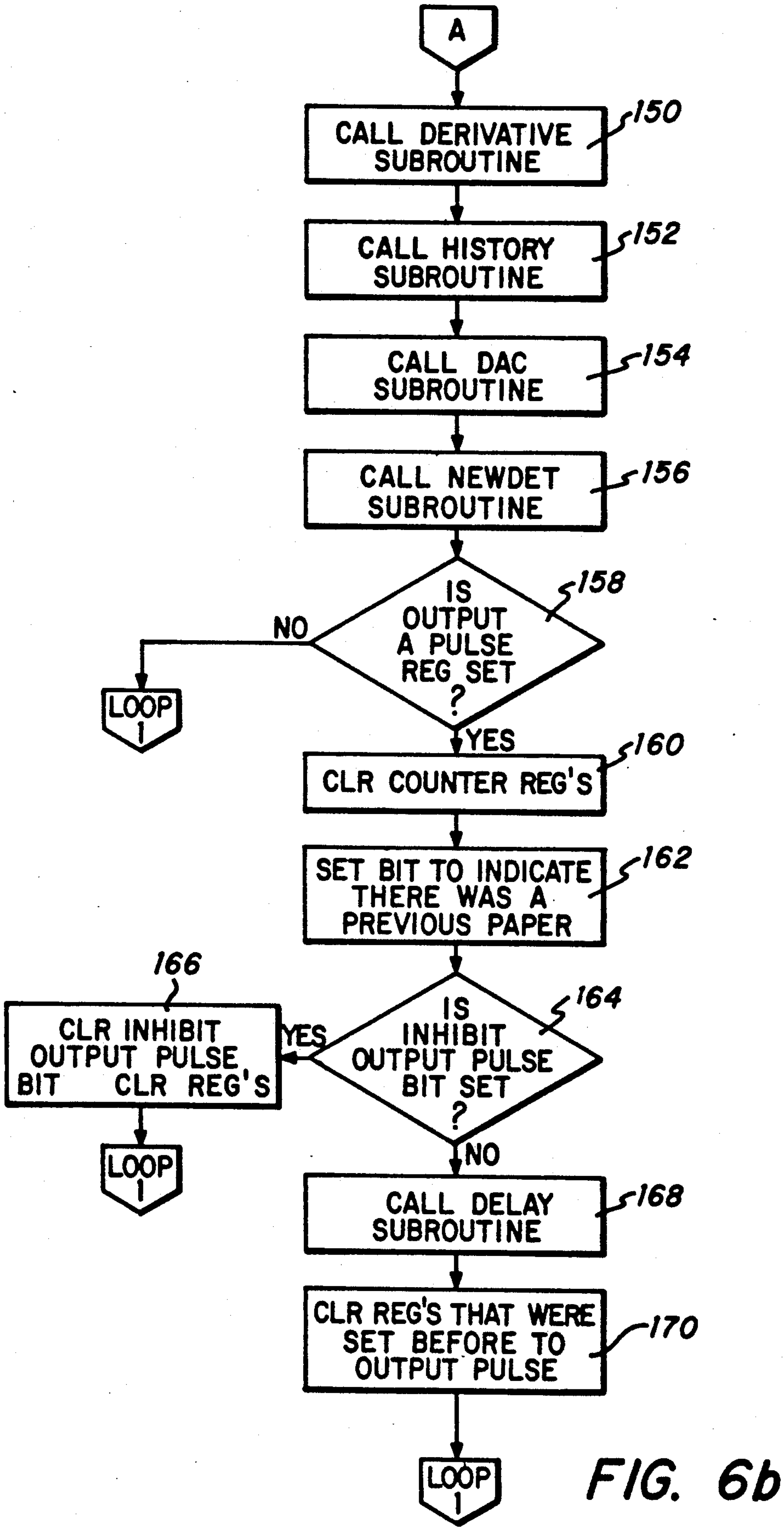

Referring now to FIG. 6*b*, the derivative subroutine is called at block 150. This subroutine is calculating from point to point or from sample to sample the difference in the derivative value in the profile of a newspaper passing detector array 8. The history subroutine is called at block 152. This subroutine saves in a rotating file four data points of the profile of a newspaper as well as the top of the newspaper and the derivatives. The program continues by calling the digital-to-analog converter (DAC) subroutine at block 154 which outputs to digital-to-analog converter 96 (FIG. 4) information such as, for example, the top of the newspaper. The next subroutine called is the new detect (NEW DET) subroutine at block 156 which detects when there is actually a newspaper present at detector array 8, when an output pulse should be generated representing a newspaper being present and whether one or multiple newspapers are present.

A decision is then made at block 158 to determine if the output pulse register is set. The output pulse register within microprocessor 44 may contain four settings indicating that: (1) an output pulse should not be generated; (2) a first criteria for outputting a pulse, a large positive derivative has been satisfied; (3) the second criteria that a zero derivative has been passed and the size indicates one newspaper present; or (4) that two newspapers are present. These conditions are represented by a zero, one, two or three contained within the output pulse register. If the output pulse register contains a zero, the program returns to block 124 (FIG. 6*a*).

If output pulse register is set to output a pulse then the decision at block 158 is yes and the counter registers of microprocessor 44 are then cleared at block 160. The counter registers within microprocessor 44 count continuously for a predetermined time intervals such as, for example, five minutes, to determine when it is required to recalibrate the system by determining the thickness of a newspaper for detecting the presence of subsequent newspapers. The calibration subroutine (FIG. 6*k*) stores the values of the first sixteen newspapers which have passed detector array 8. After the first sixteen newspapers have passed, the system is calibrated to determine whether a single newspaper or double newspaper has passed detector array 8. If there is a gap in the stream of newspapers of, for example, five minutes, when no newspapers are present, recalibration is required because, for example, different sized newspapers may be subsequently processed. Therefore, the counter registers are cleared.

After the output pulse register is set, a bit is then set at block 162 to indicate the presence of a previous newspaper for the next newspaper. A decision is then made at block 164 to determine if the inhibit output pulse bit is set. If the inhibit output pulse bit was set, no pulse is output and the inhibit pulse bit is cleared, and all registers are cleared at block 166, and the main loop starts again at block 124 (FIG. 6*a*).

If the inhibit output pulse bit was not set, the program continues by calling the delay subroutine at block 168. This subroutine actually outputs the pulses from microprocessor 44 and insures that there is a minimum spacing between the pulses output by microprocessor 44. Spacing may be, for example, 10 milliseconds between pulses. The registers that were set before the pulse was output are then cleared at block 170 and the program continues to block 124 (FIG. 6*a*).

Figure 6C:
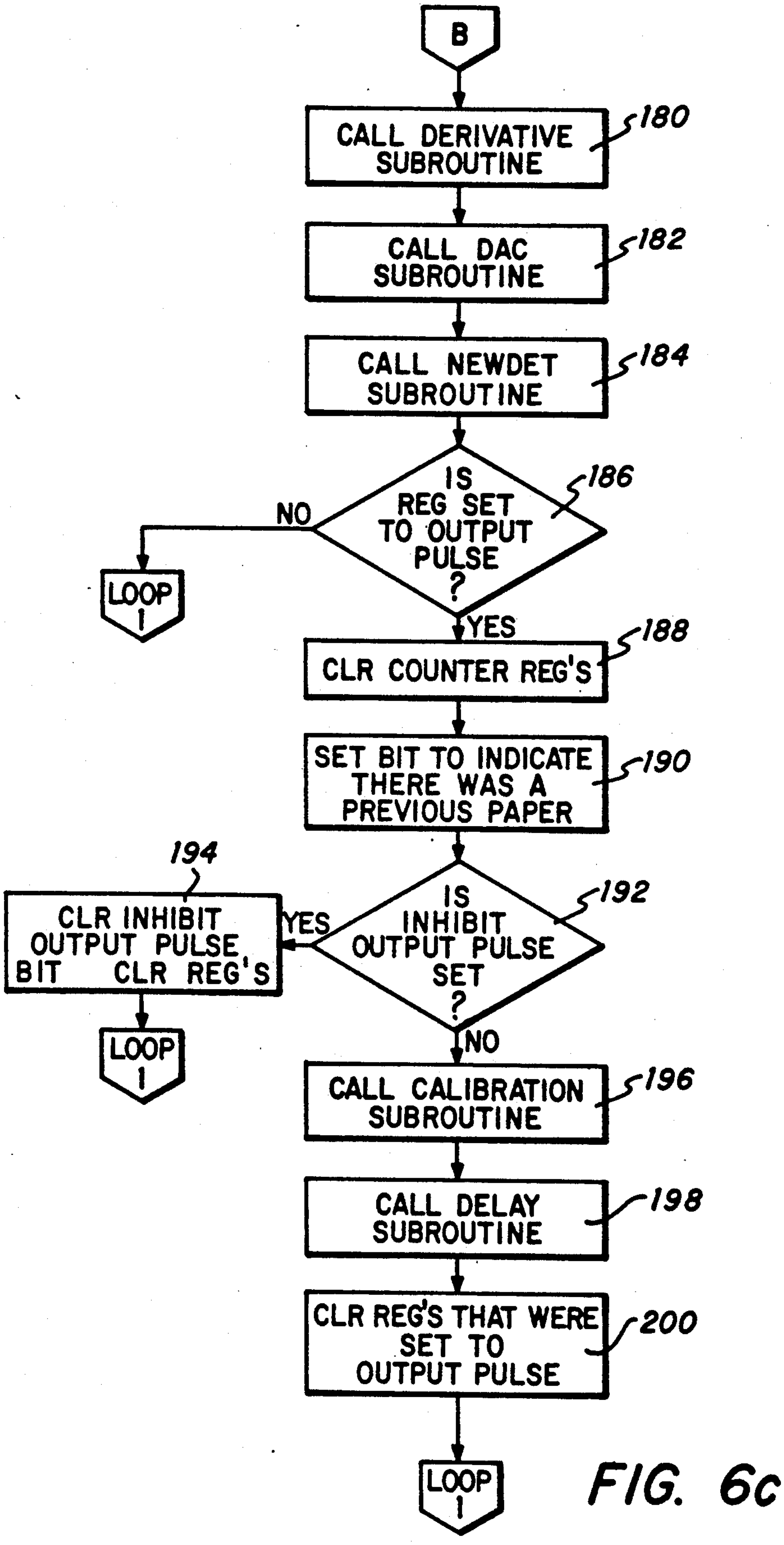

Referring now to FIG. 6*c*, if a previous newspaper was present, the derivative subroutine, digital-to-analog converter subroutine, and new detect subroutine are called at blocks 180, 182 and 184, respectively. A decision is made at block 186 to determine if the output pulse register is set, if the decision is no, the program continues to decision block 124 (FIG. 6*a*).

If the decision at decision block 186 is yes, the counter registers are cleared at block 188, and the bit to indicate that there was a previous newspaper is set at block 190. A decision is then made at block 192 to determine if the inhibit pulse was set. If the inhibit output pulse was set, no pulse is output and all the registers are cleared at block 194, and the program continues to decision block 124 (FIG. 6*a*). Up to this point in the "B branch" of the main program, the steps are identical to the "A branch" (FIG. 6*b*). However, if the inhibit output pulse was not set, the calibration subroutine (FIG. 6*k*) is called at block 196, and the program continues by calling the delay subroutine (FIG. 61) at block 198 and the registers are cleared that were set before a pulse was output at block 200, and the program continues to decision block 124 (FIG. 6*a*).

Figure 6D:
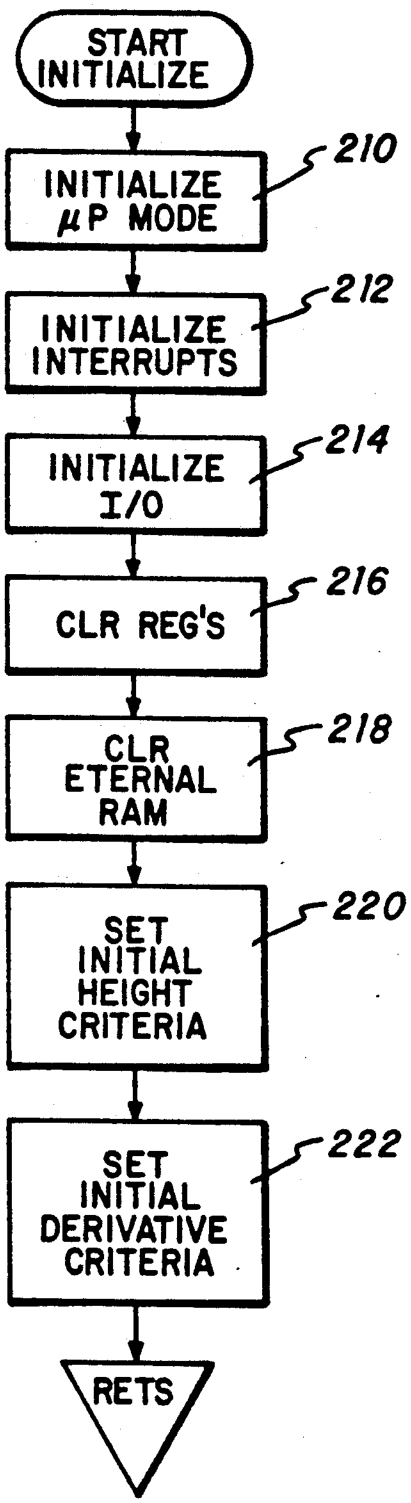

Referring now to FIG. 6*d*, the initialize subroutine is illustrated. The program of FIG. 6*d* initializes microprocessor 44 at block 210, initializes interrupts of microprocessor 44 at block 212, initializes the input/outputs of microprocessor 44 at block 214, clears the registers of microprocessor 44 at block 216, clears random access memory 94 at block 218, sets the initial height criteria for newspapers at block 220, and sets the initial derivative criteria at block 222. Initialize program then returns to main program (FIG. 6*a*).

Figure 6E:
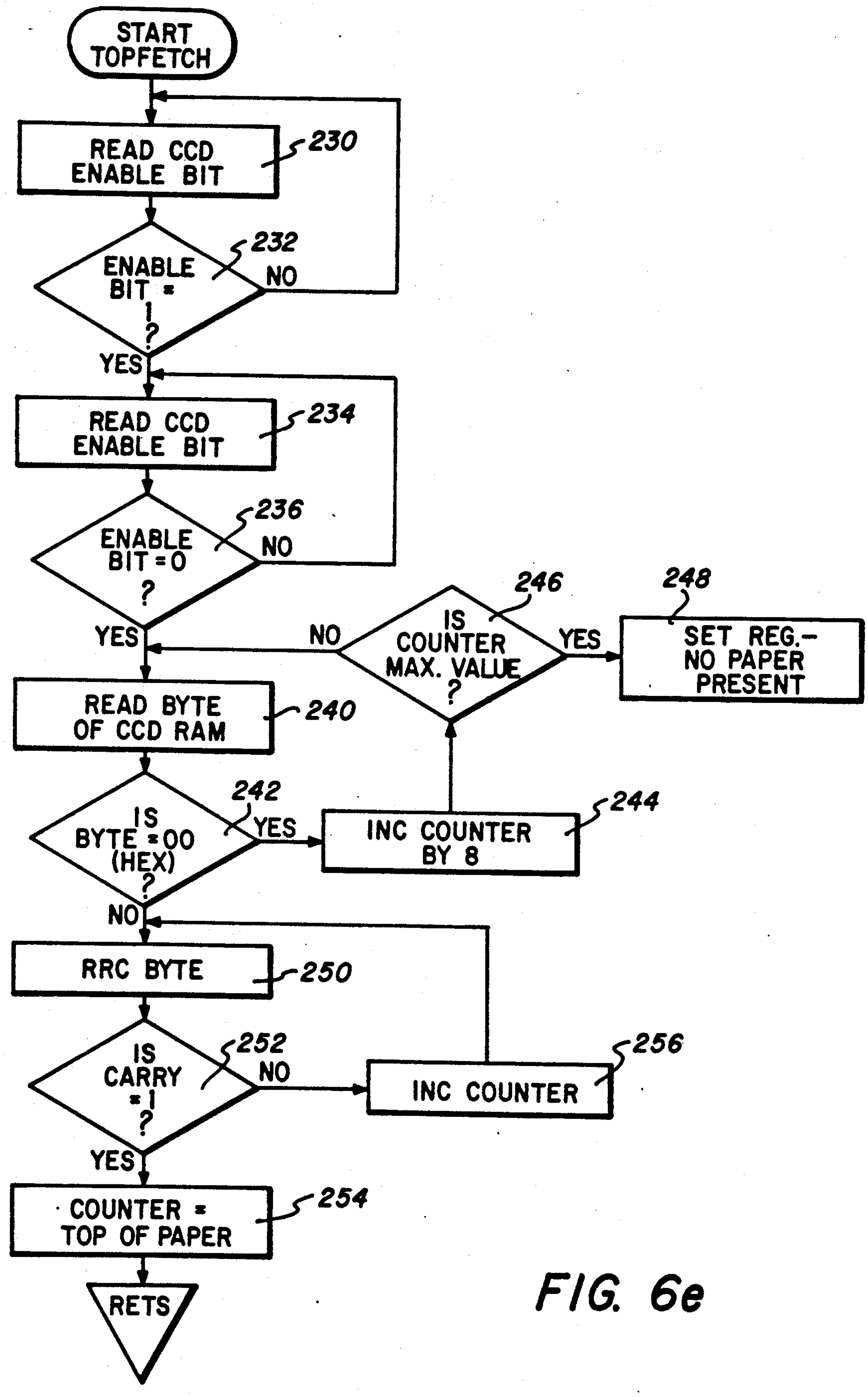

Referring to FIG. 6*e*, the software program for the top fetch subroutine is illustrated. The CCD array 8 enable bit is read at block 230. A decision is made at block 232 to determine if the enable bit is a one. If the enable bit is not, the program returns to read the enable bit at block 230. If the bit is a one, the enable bit is again read at block 234 and a decision is made at block 236 to determine if the enable bit is a zero. If the enable bit is not a zero, the bit is read again at block 234. If the enable bit is a zero, confirmation has been made that the enable bit has toggled and the bytes of RAM 36 (FIG. 3) are read at block 240. If the byte is equal to $\phi$ HEX at decision block 242, a counter within microprocessor 44 is incremented by eight at block 244. A decision is then made at block 246 to determine if the count is a maximum value. If the count is the maximum value, a register is set within microprocessor 44 indicating that no newspaper is present at block 248. If the maximum count is not present, the bytes of RAM 36 (FIG. 3) are read again at block 240. The counter that is incremented at block 244 represents a count corresponding to the top value of a newspaper. If the counter is at the maximum value, the entire array of CCD array 8 has been scanned and no newspaper has been found.

If the decision at block 242 is no, a byte that is not equal to zero has been found, and it must be determined which bit in the byte is the first one, and a rotating write through carry operation is performed at block 250. If the carry is a one at decision block 252, the value of the counter does equal the top of the newspaper and a signal is generated at block 254. If the decision at block 252 is no, the counter is incremented by one at block 256 and the program returns to block 250. Once the top of the newspaper has been determined and the counter has been set, the program returns to the main program (FIG. 6*a*).

Figure 6F:
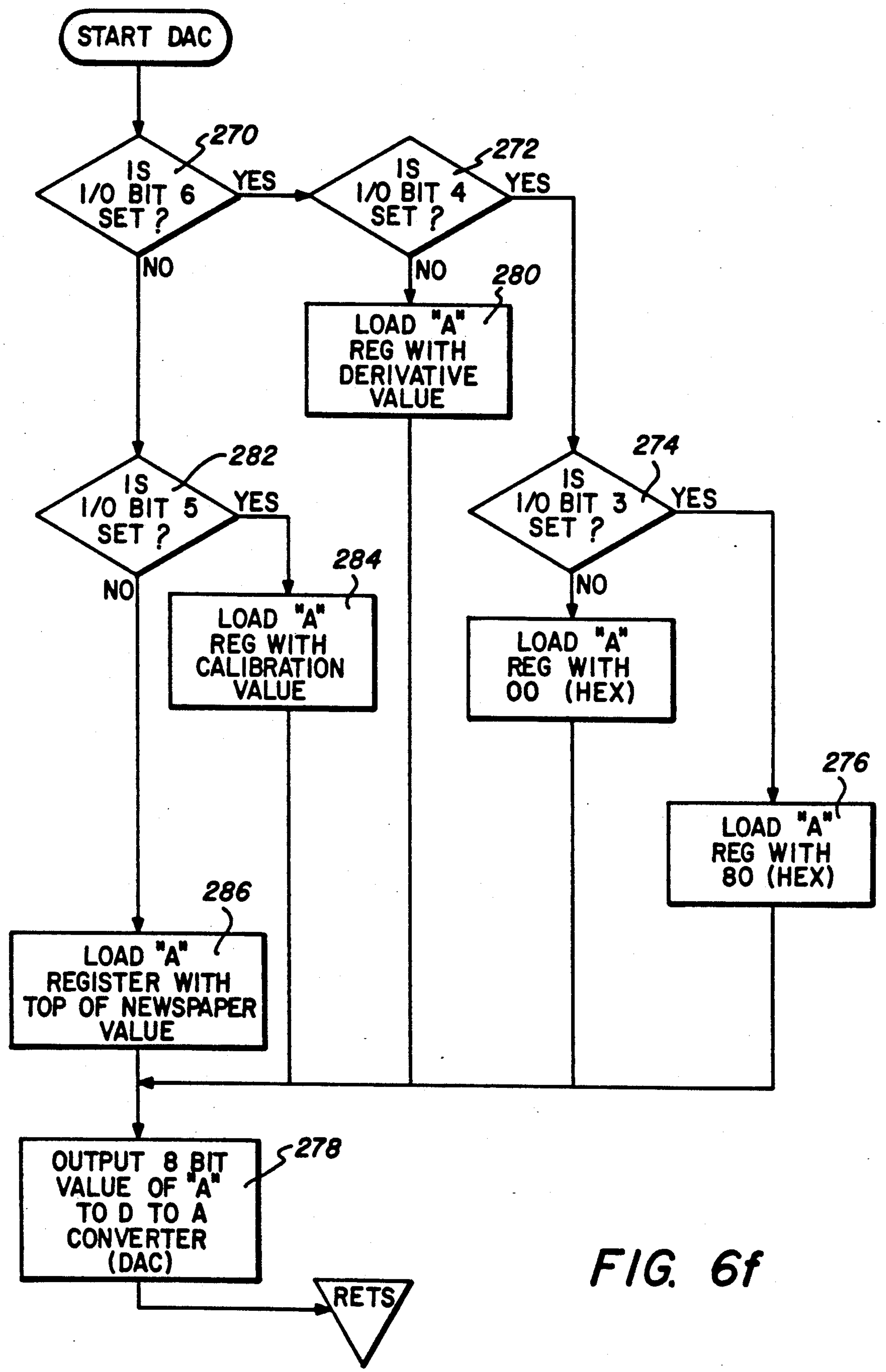

Referring now to FIG. 6*f*, the digital-to-analog converter subroutine is illustrated. This subroutine provides the analog test signal from microprocessor subsystem 49. A decision is made at block 270 to determine if the I/O bit 6 is set. If I/O bit 6 is set, a decision is then made at block 272 to determine if I/O bit 4 is set. If I/O bit 4 is set, a decision is then made at block 274 to determine if I/O bit 3 is set. If bit 3 is set, the A Register within microprocessor 44 is loaded. The A Register of microprocessor 44 contains the derivative value. The 8 bit value of the A Register is an output at block 278 to the digital-to-analog converter.

If I/O bit 3 was not set, Register A is loaded with ϕ HEX and this value is output to the digital-to-analog converter 96 (FIG. 4) at block 278. If bit 6 and bit 4 were set, the signal output to microprocessor 44 is a position input which is input via bit 3. Therefore, it is bit 3 that will be the output as the test signal at block 278.

If bit 6 is set, and bit 4 is not set, the decision at block 272 will be followed by loading Register A with a derivative value at block 280 which will be output as the test signal. If bit 6 is not set, a decision is made at block 282 to determine if bit 5 is set. If bit 5 is set, Register A is loaded with the calibration value at block 284. If bit 5 was not set, register A is loaded with the top value of the newspaper which is output as the test signal at block 278. Therefore, the test signal may include either the value of the top of the newspaper, the calibration value, the derivative value, or the position input depending upon the setting of I/O bits 3, 4, 5 and 6.

Figure 6G:
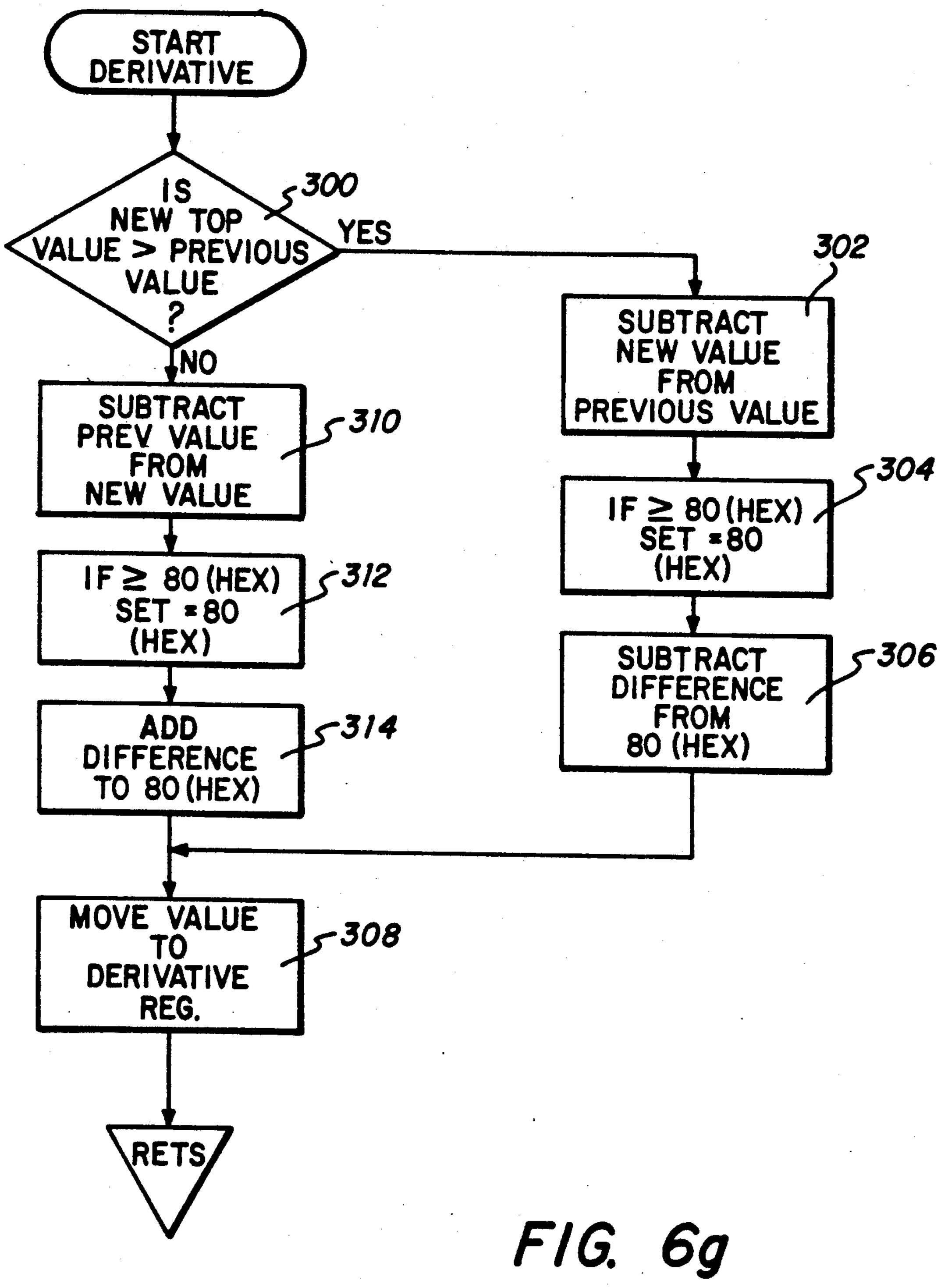

Referring now to FIG. 6*g*, the derivative subroutine is illustrated. A decision is made at block 300 to determine if the new top value of the newspaper is greater than the previous top value. If the new top value is greater than the previous top value, the new value is subtracted from the previous value at block 302. If the value after subtraction is greater than or equal to HEX 80, the value is set equal to HEX 80 at block 304. The new top value is then subtracted from HEX 80 at block 306 and this value is then input to the derivative register of microprocessor 44 at block 308 and the program returns to the main program.

If the new top value was less than the previous value, a subtraction is made by subtracting the previous value from the new value at block 310. If the resulting value is greater than HEX 80, the value is set equal to HEX 80 at block 312, and the difference is added to HEX 80 at block 314. This value is then moved to the derivative register at block 308. The purpose of the derivative subroutine of FIG. 6*g* is to ensure that the positive derivative changes are above a center reference and negative derivative changes are below a center reference where HEX 80 represents an offset value.

Figure 6H:
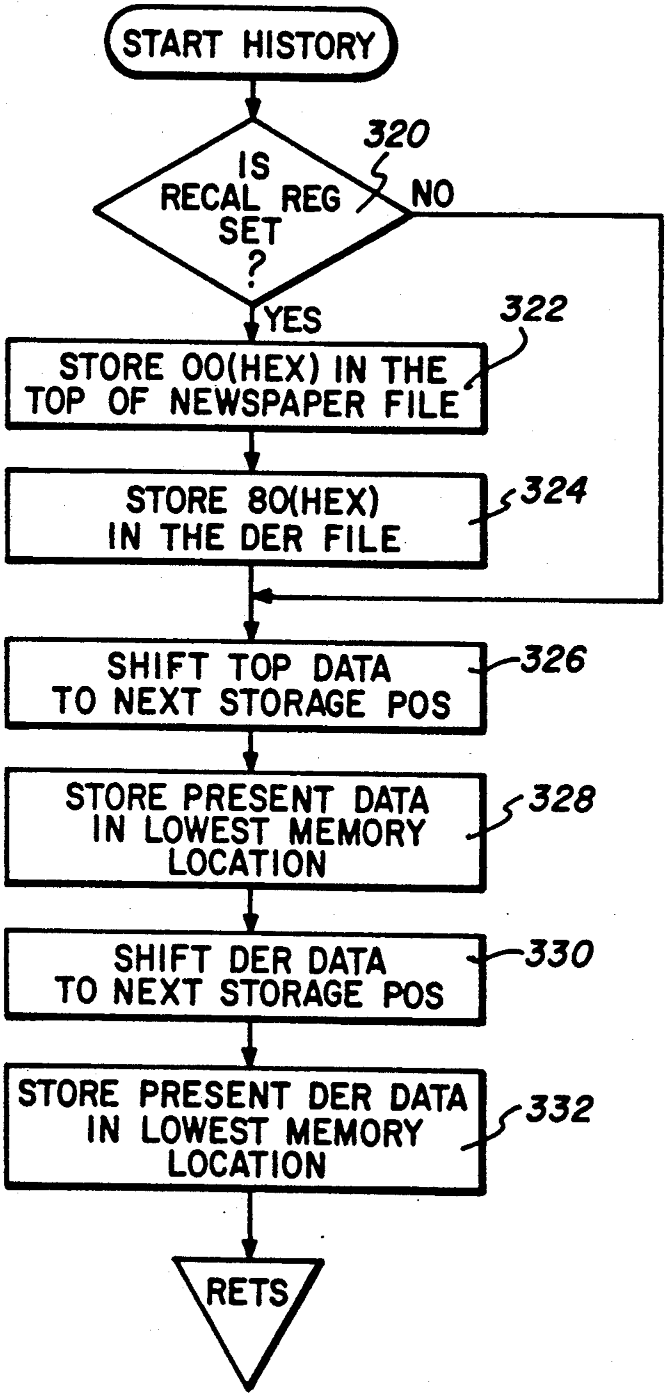

Referring now to FIG. 6*h*, the history subroutine is illustrated which functions to maintain a history of the previous four values for the top of the newspaper and the derivative values. A determination is made at block 320 to determine if the recalibration register is set. If the register is set, the value of ϕ (HEX) is stored in the top newspaper file at block 322. The value of 80 (HEX) is stored in the derivative file at block 324. If the decision at block 320 were no, the program continues to shift the top data to the next storage position at block 326. The previous data stored in the highest memory location is then dropped. The present data is stored in the lowest memory location at block 328. The derivative data is shifted into the next storage position at block 330, and the previous data stored in the highest memory location for the derivative data is dropped. The present derivative data is then stored in the lowest memory location at block 332 and the program returns to the main program (FIG. 6*a*).

Figure 6I:
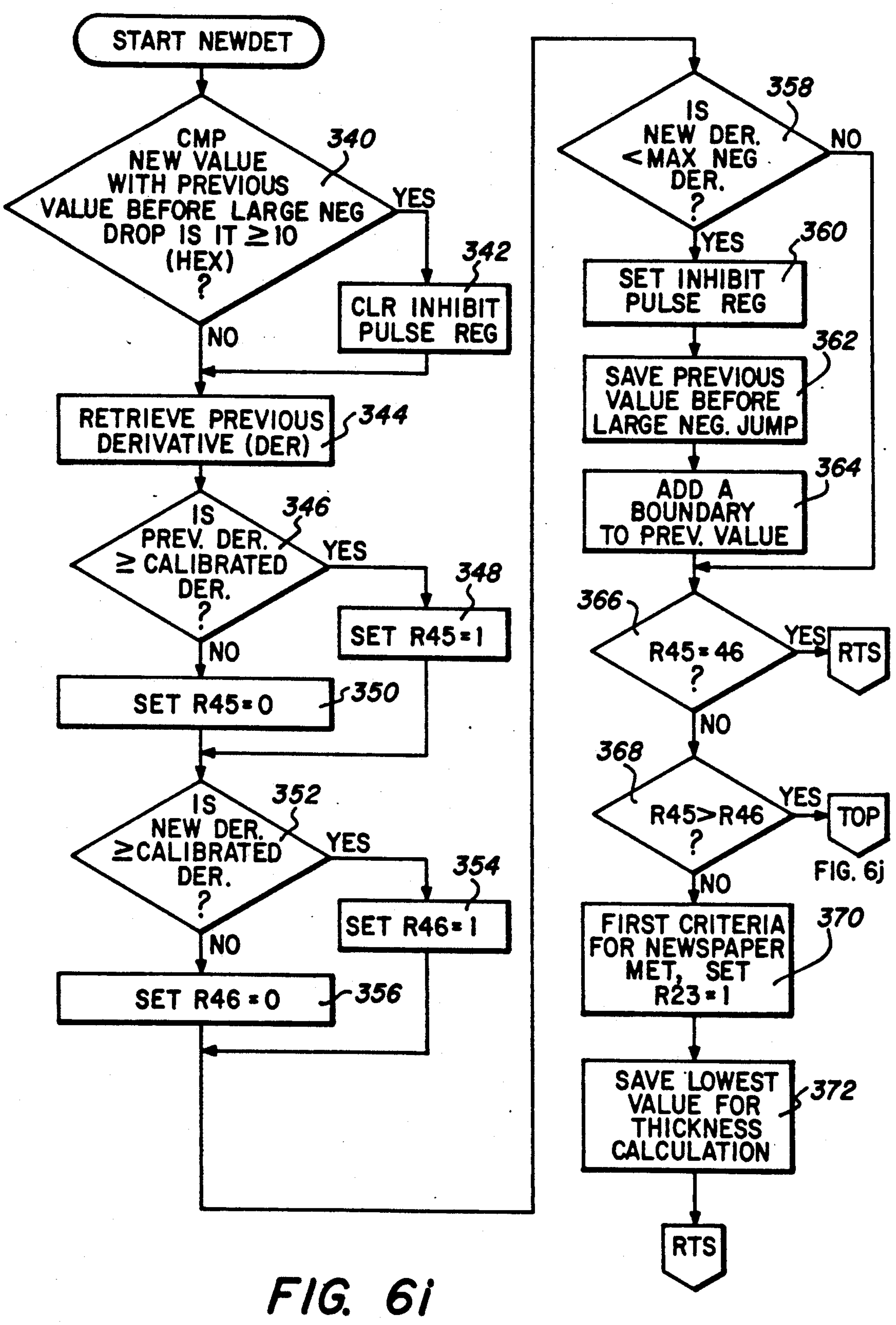
Figure 6J:
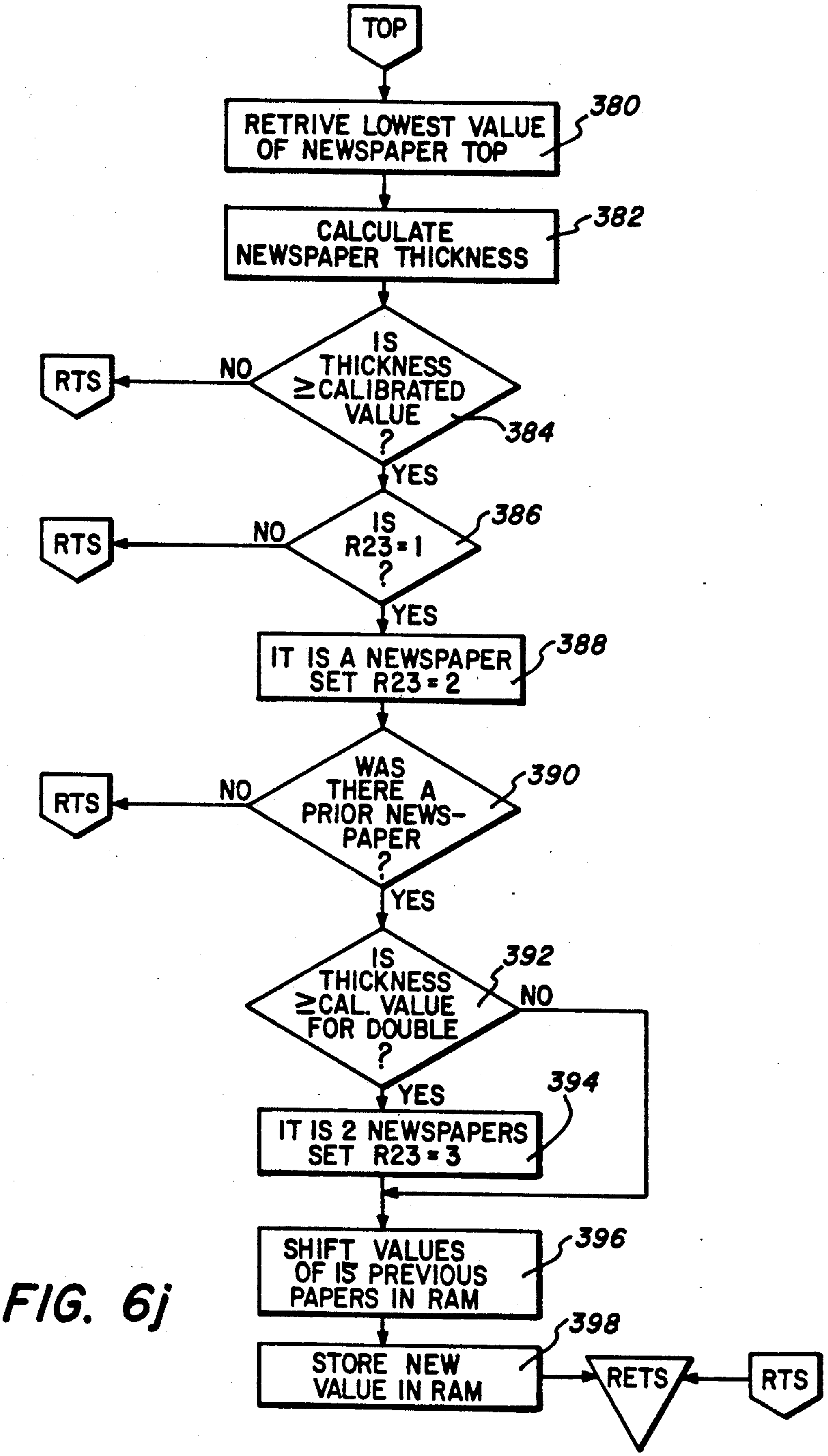
Figure 6K:
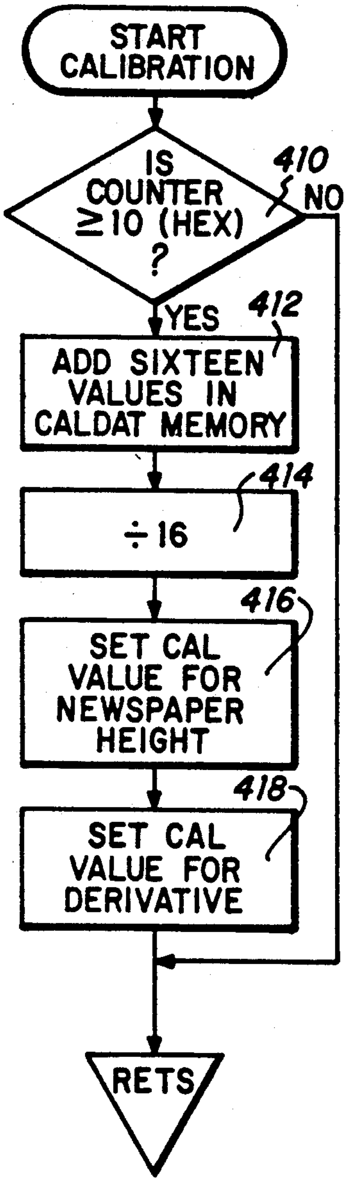
Figure 6L:
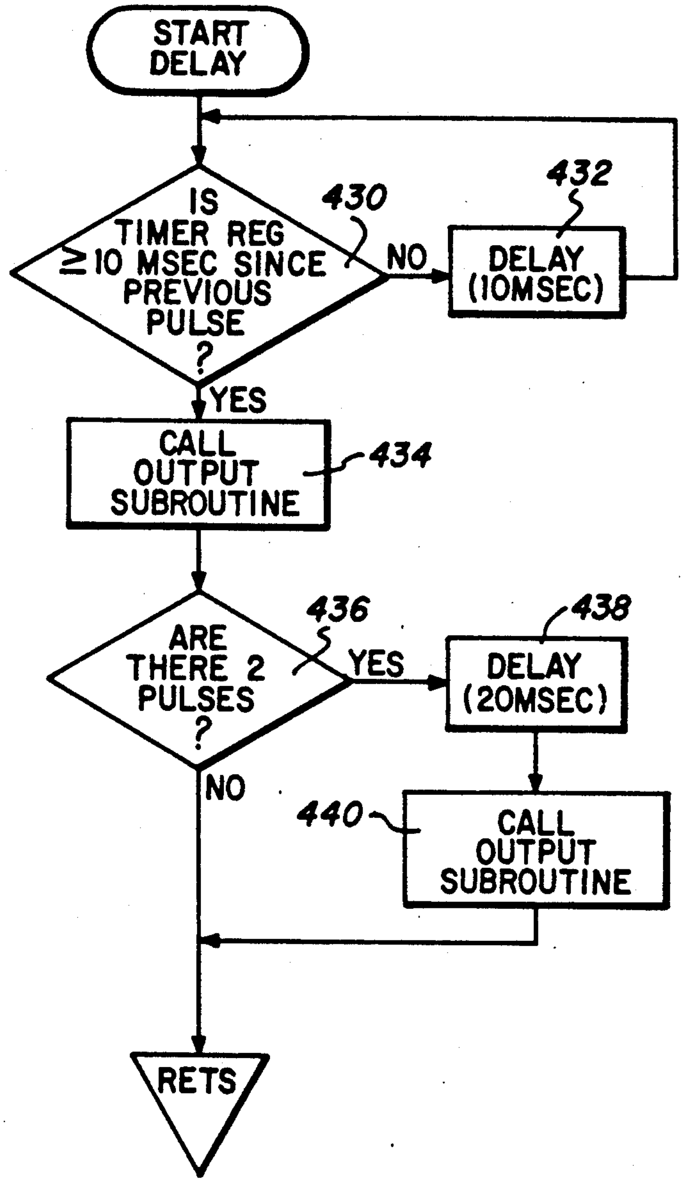
Figure 6M:
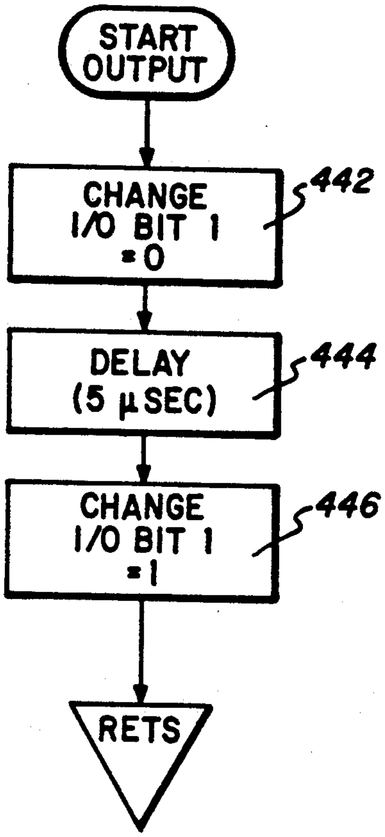
Figure 6N:
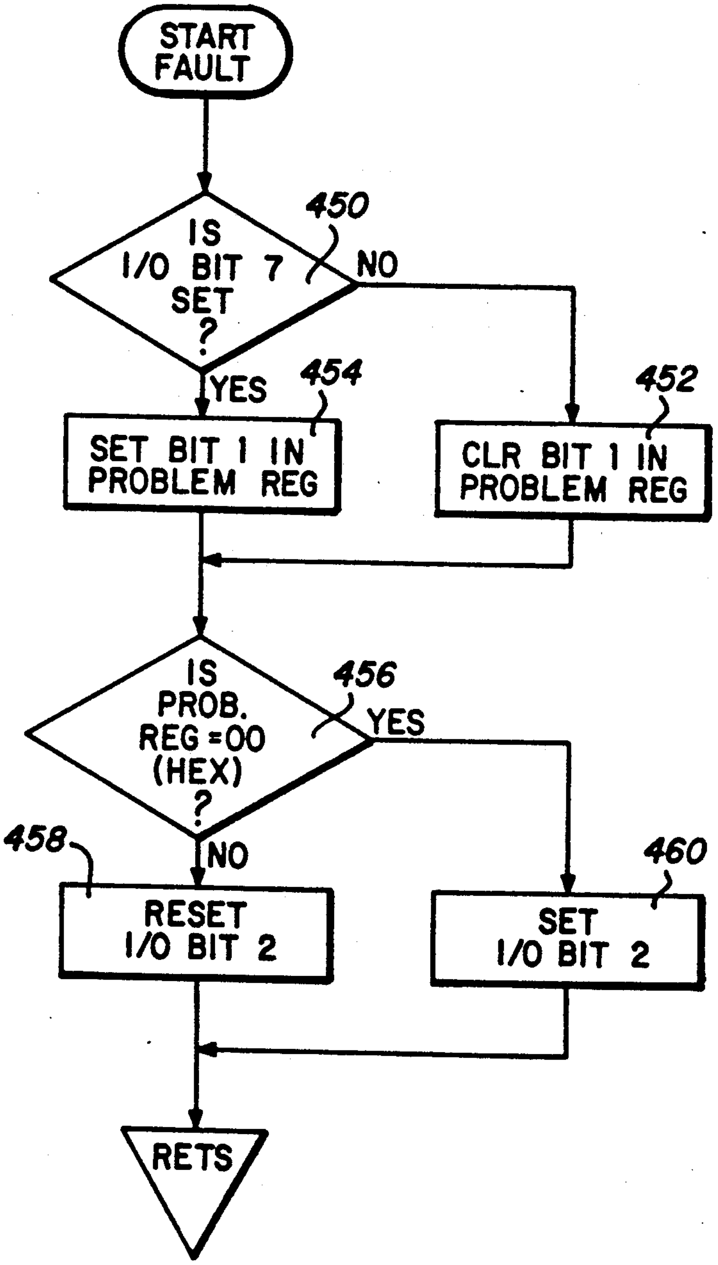
Figure 6O:
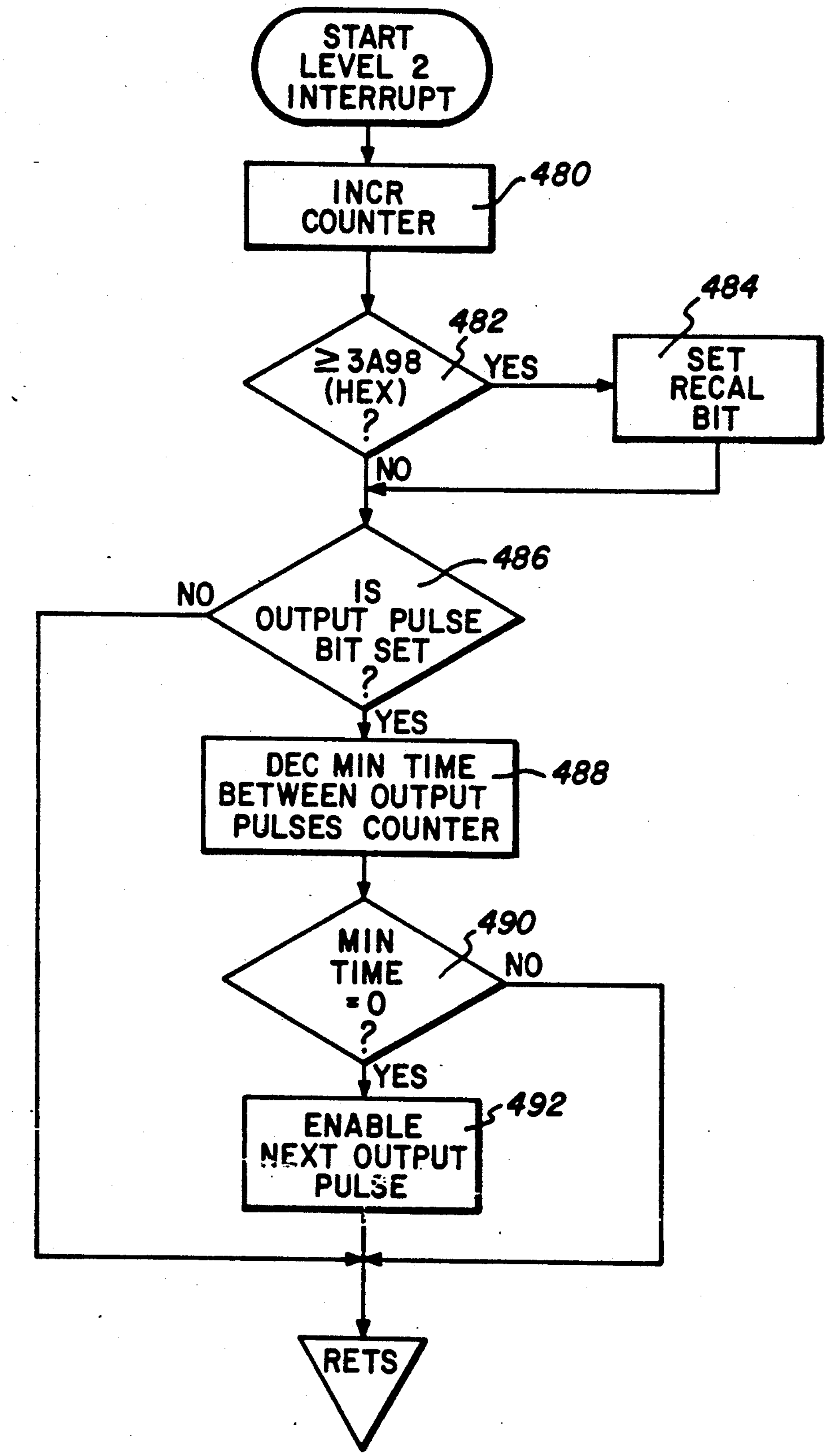

Referring now to FIG. 6*i*, the new detect subroutine which contains the software for detecting a single or double newspaper is illustrated. A comparison is made at block 340 to compare the new derivative value with the previous value before a large negative drop to determine if the drop is greater than or equal to 10 (HEX). This comparison performs noise filtering to insure that the edge of a newspaper is actually present, and that folds within a newspaper do not appear as actual newspapers. If the criteria at decision block 340 is met, the inhibit pulse register at block 342 is cleared to begin the process of preventing a count pulse since no newspaper is actually present.

If the decision at block 340 is no, representing that a single newspaper is present, the program continues at block 344 by retrieving the previous derivative. A decision is then made at block 346 to determine if the previous derivative value is greater than the calibrated derivative value. If the decision is yes, register 45 is set equal to one at block 348, and if the decision is no, register 45 is set equal to zero at block 350. A decision is then made at block 352 to determine if the new derivative value is greater than or equal to the calibrated derivative value. If the decision is yes, a register 46 is set equal to one at block 354, and if the decision is no, register 46 is set equal to zero at block 356.

A decision is then made at block 358 to determine if the new derivative value is less than the maximum derivative value. The function of this inquiry is to determine if the negative derivative value drops more than a certain amount and if this decision is yes, the data represents noise, and the inhibit pulse register is set at block 360. The setting of the inhibit pulse register will thereby inhibit the next pulse when this condition occurs. The previous value before the large negative derivative jump is saved at block 362 and a boundary value is added to the previous value at block 364. A decision is then made at block 366 to determine if the value stored within register 45 is equal to the value stored within register 46. If the answer is yes, indicating that there is a flat slope, the new detect subroutine is re-executed. If the decision at block 366 is no, a decision is made to determine if the value of register 45 is greater than the value of register 46 meaning that register 45 contains a zero and register 46 contains a one at block 368. If this decision is yes, the top edge of the newspaper has been located and the profile is decreasing, having passed through the zero derivative point and the new detect program continues with FIG. *6j*. If the decision at block 368 is no, the value of register 46 is equal to one and the value of register 45 is equal to zero, the first criteria for a newspaper being present is set at block 370, indicating that there is a positive change in the derivative. The lowest value for the thickness calculation is then saved at block 372 and the new detect subroutine is re-executed.

A new detect program is continuously re-executed until the value stored in register 45 is greater than the value stored in register 46 at which point the new detect program continues at FIG. *6j* and the lowest value of the newspaper top is retrieved at block 380. The newspaper thickness is then calculated at block 382. A decision is then made at block 384 to determine if the calculated thickness is greater than the calibrated value. If this criteria is met, a decision is made at block 386 to determine if register 23 is set equal to 1. If the answer is yes, the criteria for a newspaper being present is satisfied, and register 23 is set equal to 2 at block 388. If either of the decisions at blocks 384 and 386 were no, indicating that the criteria for a newspaper being present are not satisfied, the new detect program is re-executed.

A decision is then made at block 390 to determine if there was a prior newspaper present. If the answer is yes, a decision is made at block 392 to determine if the thickness is greater than or equal to the calculated value for a double newspaper being present. If the thickness criteria is satisfied, register 23 is set equal to a three at block 394. The value of register 23 for the previous fifteen newspapers is then shifted into RAM 94 (FIG. 4) and a new value is also shifted into RAM 94 at block 398. The new detect subroutine is then re-executed.

Referring now to FIG. *6k*, the calibration subroutine determines the calibration value for height and derivative value. Present within microprocessor 44 is a counter which is initialized to zero. The first sixteen newspapers passing CCD array 8 are utilized for generating a calibration value for height. The height values for the first sixteen newspapers are loaded into RAM 94 (FIG. 4). A decision is made at decision block 410 to determine if the sixteen newspapers have passed CCD array 8. If less than sixteen have passed, the calibration subroutine continues. A yes decision at block 410 indicates that all sixteen newspapers have passed CCD array 8 and the sixteen values are summed at block 412. The sum is divided by sixteen at block 414, and the calibration value for newspaper height is set up at block 416. The calibration values are set at block 418 and the calibrate subroutine is completed and the program returns to the main program (FIG. *6a*).

Referring to FIG. *6l*, the delay subroutine is illustrated and functions to space the output pulses for the count of newspapers. A decision is made at block 430 to determine if the value stored within a timer register of microprocessor 44 is greater than or equal to 10 milliseconds since the previous interrupt pulse. If the decision is no, the delay of 10 milliseconds is introduced at block 432. If the decision is yes, the output subroutine (FIG. *6m*) is called at block 434. A decision is then made at block 436 to determine if two pulses are to be output. If the decision is yes, indicating that the value within register 23 is equal to three, indicating two newspapers present, a delay of an additional 10 milliseconds is introduced at block 438 and the output subroutine (FIG. *6m*) is called at block 440. The program then returns to the main subroutine (FIG. *6a*).

Referring now to FIG. *6m*, the output subroutine is illustrated which outputs the pulse to trigger one shot device 100 (FIG. 4). The output subroutine functions to change the input/output bit one to a zero at block 442, introduce a delay of, for example, five microseconds at block 444 and change I/0 bit one back to a one at block 446. Changing of I/0 bit one from a zero to a one triggers one shot device 100 (FIG. 4) which is set to output the pulse for a 10 millisecond width. The delay introduced by the output subroutine is not critical, so long as it is less than the output of one-shot device 100.

Referring now to FIG. *6n*, the fault subroutine is illustrated for detecting a failure of light source 10 or whether the newspaper has gone above linear detector array 8 to output a fault condition. A decision is made at block 450 to determine if I/O bit 7 is set. Bit 7 is the input from lamp "on" detector (FIG. 4). If bit 7 is not set, bit 1 in a problem register within microprocessor 44 is cleared at block 452. If the bit 7 is set, bit 1 in the problem register is set at block 454. A decision is then made at block 456 to determine if the problem register is set equal to $\phi$ HEX from another location within the program. If the decision at block 456 is yes, then the I/O bit 2 is reset at block 458, and if the decision is no, the I/O bit 2 is set at block 460. The program then returns to the main program (FIG. *6a*).

Referring now to FIG. *6o*, the interrupt subroutine is illustrated for entering an interrupt every, for example, 0.33 milliseconds so that microprocessor 44 generates an interrupt for incrementing a counter at block 480. The counter at block 480 is reset after the output of a pulse. If no newspapers have gone past detector array 8, the counter continues to count. A decision is made at block 482 to determine if the count is greater than 3A98 (HEX) representing the passage of five minutes. If the decision is yes, the recalibration bit is set at block 484, since no newspapers have passed by detector array 8.

If the decision at block 42 is no, a decision is made at block 486 to determine if the output pulse bit is set. If the output pulse bit is set, the counter representing the time between output pulses is decremented at block 488. A decision is then made at block 490 to determine if the minimum time is zero. If the time is zero, the next output pulse is enabled at block 492. If the decision is no, the interrupt program returns to the main program (FIG. *6a*). Microprocessor 44 will automatically generate the interrupt to execute the interrupt program of FIG. *6o*.

While the present invention has been described with respect to a particular embodiment thereof, it is not to be so limited, as changes might be made therein which fall with scope of the invention as defined in the appended claims.

We claim:

1. A system for obtaining a count of overlapped newspapers delivered to a newspaper stacker comprising:

first means for optically focusing the side image of the newspapers on a linear detector array including;
  a light source;
  a lens system oriented in a plane generally parallel to the surface of the newspapers and parallel to said linear detector array;

a first mirror for receiving reflected light from the edges of the newspapers; and a second mirror generally disposed at an angle of 45° from said first mirror for transmitting an image of the edges of the newspapers from said first mirror to said lens system;

second means for shifting analog outputs at a clock defined rate from said detector array to differential amplifier means for removing the DC offset therefrom;

third means receiving the output from said differential amplifier means and for converting said differential amplifier means output to a digital output signal as defined by a selected light level, a shift register for receiving said third means output signal, a microprocessing means for developing an image top profile value of the newspaper flow image as it appears in said linear detector array based upon the output of said shift register;

means for comparing the difference between successive newspaper image top profile values to obtain a derivative of successive image top profile values;

means for initiating a newspaper count output when the rate of change of successive image top profile values change from positive to negative; and means to develop a newspaper thickness definite value, said newspaper count output comprises a single count increment when said newspaper thickness definitive value exceeds a calibrated thickness value and said newspaper count output comprises a double count increment when said measured newspaper thickness exceeds a second calibrated thickness value.

2. A system for obtaining a count of overlapped newspapers delivered to a stacker comprising, a linear CCD array oriented parallel to the surface of the newspapers;

means for optically focusing the side image of the newspapers on said linear CCD array including;

a light source;

a lens system oriented in a plane generally parallel to the surface of the newspapers and parallel to said linear detector array;

a first mirror for receiving reflected light from the edges of the newspapers; and a second mirror generally disposed at an angle of 45° from said first mirror for transmitting an image of the edges of the newspapers from said first mirror to said lens system;

means for shifting outputs from said photodetector array at a clock defined rate;

signal processing means for receiving said outputs from said linear CCD array;

said signal processing means comprising means for developing clock defined repetitive sequential values of the top profile of the newspapers as the newspapers are stacked;

means for comparing each of said values with the next preceding one of said values to obtain a derivative value of the top profile of said newspapers;

means for initiating a newspaper count output increment when said derivative values change from positive to negative; and means to develop a newspaper thickness definite value from a comparison between the previous newspaper top profile value and the existing newspaper top profile value, and difference value calculated from sample to sample changes from positive to negative of the existing newspaper, said newspaper count output comprising a single count increment when said newspaper thickness definitive value exceeds a calibrated value thickness, and said newspaper count output comprising a double count increment when said newspaper thickness value exceeds a second calibrated value thickness.

* * * * *

UNITED STATES PATENT AND TRADEMARK OFFICE

CERTIFICATE OF CORRECTION

PATENT NO. : 5,016,281

DATED : MAY 14, 1991

INVENTOR(S) : SUSAN G. EPPLER AND ROBERT M. MOOREHEAD

It is certified that error appears in the above-identified patent and that said Letters Patent is hereby corrected as shown below:

COLUMN 10, LINE 64, "Ø" SHOULD BE -- ØØ --.

COLUMN 11, LINE 33, "Ø" SHOULD BE -- ØØ --.

COLUMN 12, LINE 11, "Ø" SHOULD BE -- ØØ --.

COLUMN 14, LINE 26, "Ø" SHOULD BE -- ØØ --.

Signed and Sealed this

Fifth Day of January, 1993

*Attest:*

DOUGLAS B. COMER

*Attesting Officer*

*Acting Commissioner of Patents and Trademarks*